United States Patent
Saha (10) Patent No.: US 10,918,993 B1
(45) Date of Patent: Feb. 16, 2021

(54) PHIPPS INDOOR AIR FILTER (PIAF) FOR CAPTURING AND DESTROYING PATHOGENIC VIRUSES LIKE COVID 19

(71) Applicant: Anuj K Saha, Martinez, GA (US)

(72) Inventor: Anuj K Saha, Martinez, GA (US)

( * ) Notice: Subject to any disclaimer, the term of this patent is extended or adjusted under 35 U.S.C. 154(b) by 0 days.

(21) Appl. No.: 16/997,478

(22) Filed: Aug. 19, 2020

(51) Int. Cl.
*B01D 53/02* (2006.01)
*B01D 53/84* (2006.01)

(52) U.S. Cl.
CPC ........... *B01D 53/84* (2013.01); *B01D 53/02* (2013.01); *B01D 2253/102* (2013.01); *B01D 2253/25* (2013.01); *B01D 2257/91* (2013.01); *B01D 2258/06* (2013.01)

(58) Field of Classification Search
CPC ........ B01D 53/02; B01D 53/04; B01D 53/84; B01D 2253/102; B01D 2253/25; B01D 2257/91; B01D 2258/06
USPC ................... 96/108, 145, 223, 226
See application file for complete search history.

(56) References Cited

U.S. PATENT DOCUMENTS

| | | | | |
|---|---|---|---|---|
| 5,433,923 A * | 7/1995 | Wolverton | ............. | A62B 11/00 422/121 |
| 5,747,053 A * | 5/1998 | Nashimoto | .......... | A61K 9/0095 424/405 |
| 8,707,619 B2 * | 4/2014 | Edwards | ................ | B01D 53/85 47/66.7 |
| 9,963,367 B1 | 5/2018 | Saha | | |
| 10,059,605 B1 | 8/2018 | Saha | | |
| 2002/0104436 A1 * | 8/2002 | Logstrup | ................ | B01D 53/85 95/90 |
| 2003/0224507 A1 * | 12/2003 | Darlington | ............. | A01G 31/00 435/300.1 |
| 2011/0126501 A1 * | 6/2011 | Kim | .................... | A61K 31/7024 55/524 |
| 2011/0154985 A1 * | 6/2011 | Mittelmark | ............... | F24F 3/16 95/1 |
| 2014/0140887 A1 * | 5/2014 | Parham | ..................... | A61L 9/14 422/4 |
| 2017/0120178 A1 * | 5/2017 | Schacht | .................... | A61L 9/00 |
| 2018/0243674 A1 * | 8/2018 | Gulrez | ............... | B01D 39/1623 |

* cited by examiner

*Primary Examiner* — Frank M Lawrence, Jr.
(74) *Attorney, Agent, or Firm* — RB Consulting, Inc; James Carson (57) ABSTRACT

The Phipps indoor air filter (PIAF) is configured for use with an indoor atmosphere that contains one or more pathogenic viruses. The PIAF is a pharmacologically and phytochemically (P&P) active structure that removes the one or more viruses from the confined indoor atmosphere. The PIAF removes the one or more viruses by: a) sequestering the one or more viruses within the PIAF; and, b) terminating the biological processes of the one or more viruses using P&P structures. The PIAF incorporates a flow chamber and a filter structure. The flow chamber contains the filter structure. The flow chamber forces or draws an air flow through the filter structure contained within the flow chamber. The filter structure physically and biochemically: a) sequesters the one or more viruses; and, b) terminates the biological processes of the one or more viruses by exposing the one or more viruses to the P&P structures.

18 Claims, 1 Drawing Sheet

PHIPPS INDOOR AIR FILTER (PIAF) FOR CAPTURING AND DESTROYING PATHOGENIC VIRUSES LIKE COVID 19

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of the separation and destruction of pathogenic virus laden gases and vapors including the purification of gases using phytochemical, pharmacological, and biological means. More specifically, an air cleansing and purifying device to safeguard human health against deadly viruses like COVID 19.

Biological Background

A virus is a microorganism. A virus comprises a nucleic acid and a protein shell. The protein shell forms a containment structure for the nucleic acid structure. In this disclosure, the virus is assumed to be a deadly poison or toxin, more specifically a pathogenic microorganism. The terms poison and toxin are described elsewhere in this disclosure. The virus is a biochemical structure that "infects" a host cell. By infecting a host cell is meant that the virus deposits the nucleic acid structure in the host cell such that the energy produced by the biochemical processes with the host cell is diverted towards the replication of the nucleic acid structure of the virus. An evolved virus refers to a virus that further comprises an envelope. The envelope is a lipid based structure that is similar to a cell membrane. The envelope encloses and protects the nucleic acid structure and the protein shell. The virus is defined elsewhere in this disclosure.

SUMMARY OF INVENTION

The Phipps indoor air filter (PIAF) is a device for continuous cleansing of indoor air to keep it free from pathogenic viruses like COVID 19. The PIAF has multiple phytochemically and pharmacologically active media (P&P media) and nano silver embedded substrate that removes one or more pathogenic viruses from the indoor ambient. The PIAF removes the one or more viruses by: a) sequestering COVID 19 and other viruses within the PIAF; and b) breaking down or terminating the biological processes of the viruses propagation using P&P media structures and a nano silver embedded substrate. The PIAF incorporates a flow chamber and several stages of packed filter media. The flow chamber contains the filter structure. The flow chamber draws or pushes an air flow through the packed filter media within the flow chamber. The filter unit physically: a) sequesters the one or more viruses; and, b) breaks down the biological processes of propagation for one or more viruses by exposing the one or more viruses to the P&P media and a nano silver embedded stage.

These together with additional objects, features and advantages of the PIAF will be readily apparent to those of ordinary skill in the art upon reading the following detailed description of the presently preferred, but nonetheless illustrative, embodiments when taken in conjunction with the accompanying drawings.

In this respect, before explaining the current embodiments of the PIAF in detail, it is to be understood that the PIAF is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the PIAF.

It is therefore important that the claims be regarded as including such equivalent construction insofar as they do not depart from the spirit and scope of the Phipps indoor air filter. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
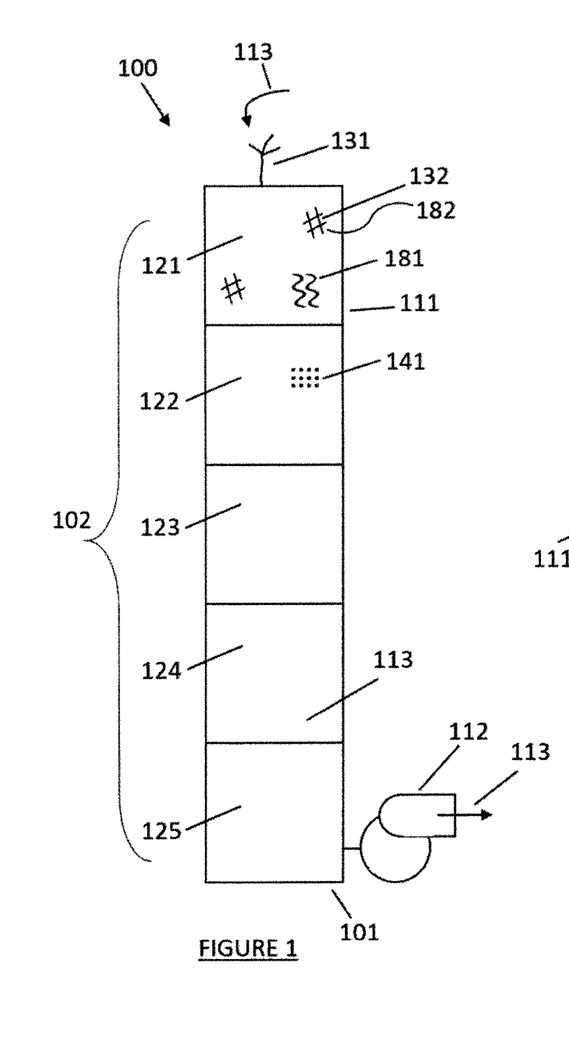
FIG. 1 is a pull mode elevation view of an embodiment of the disclosure.
Figures 2, 3:
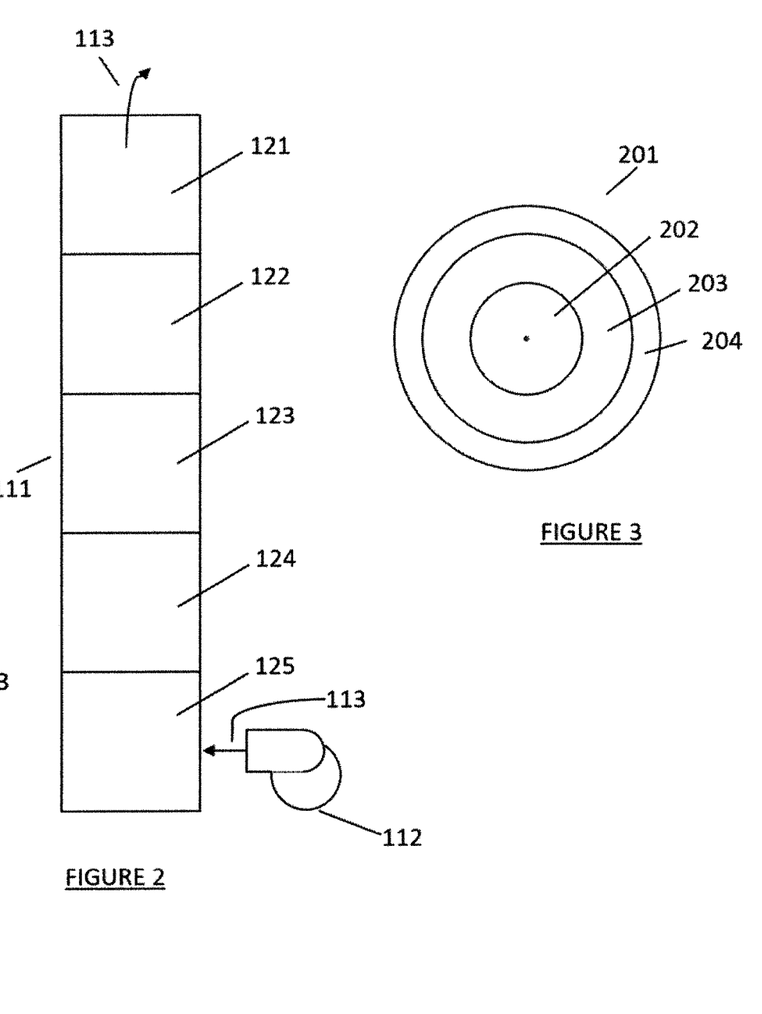
FIG. 2 is a push flow elevation view of an embodiment of the disclosure.
FIG. 3 is a detail side view of an embodiment of the disclosure.

Detailed reference will now be made to one or more potential embodiments of the disclosure, which are illustrated in FIGS. 1 through 3.

The Phipps indoor air filter 100 (hereinafter invention) is a continuous air cleansing and filtration device that captures one or more air borne pathogenic viruses (including COVID 19). The invention 100 eliminates the one or more viruses. The invention 100 terminates the one or more viruses by breaking down its molecular structure The invention 100 is configured for use in an indoor atmosphere that contains the one or more viruses 201. The invention 100 is a P&P media structure that removes the one or more viruses 201 from the atmosphere. The invention 100 removes the one or more viruses 201 by: a) sequestering the one or more viruses 201 within the invention 100; and, b) terminating the biological processes of the one or more viruses 201 using biochemical structures. The invention 100 comprises a flow chamber 101 and a filter structure 102. The flow chamber 101 houses the filter structure 102. The flow chamber 101 forces an air flow 113 through the filter structure 102 contained within the flow chamber 101. The filter structure 102 physically: a) sequesters the one or more viruses 201; and, b) terminates the biological processes of the one or more viruses 201 by exposing the one or more viruses 201 to biochemical structures formed from P&P media.

The virus 201 is described and defined elsewhere in this disclosure. The nucleic acid structure 202 is described and defined elsewhere in this disclosure. The protein shell 203 is described and defined elsewhere in this disclosure. The envelope 204 is described and defined elsewhere in this disclosure.

The flow chamber 101 is a mechanical structure. The flow chamber 101 houses the filter structure 102. The flow chamber 101 generates an air flow 113 through the filter structure 102. Specifically, the flow chamber 101 forces unprocessed air through the filter structure 102 such that the filter structure 102 removes airborne viruses 201 from the air flow 113. The flow chamber 101 comprises a containment structure 111 and a blower 112. The blower 112 generates an air flow 113 through the containment structure 111.

The containment structure 111 is a prism-shaped structure. The containment structure 111 is a hollow structure. The containment structure 111 has a tubular shape with a vertical orientation. The filter structure 102 inserts into the hollow interior of the containment structure 111. The containment structure 111 transports the air flow 113 through the flow chamber 101. The containment structure 111 guides the air flow 113 through the filter structure 102 for processing.

The blower 112 is a mechanical device. The blower 112 generates the air flow 113 through the containment structure 111 and the filter structure 102. The blower 112 generates an atmospheric pressure differential along the center axis of the prism structure of the containment structure 111. The pressure differential generated by the blower 112 creates the motive forces necessary to move the air flow 113 through the containment structure 111 and the filter structure 102.

The air flow 113 refers to the passage of atmospheric gases and vapors through the containment structure 111 of the flow chamber 101. The air flow 113 exposes the viruses 201 contained within the air flow 113 to the filter structure 102.

The filter structure 102 is a mechanical structure. The filter structure 102 is formed from a plurality of bed filters. The filter structure 102 captures and sequesters viruses 201 found in the air flow 113. The filter structure 102 disrupts the biochemistry of the virus 201. Specifically, the filter structure 102 terminates the biochemistry of the envelope 204 of the virus 201. The filter structure 102 further terminates the biochemistry of the protein shell 203 of the virus 201. The filter structure 102 uses a metallo-organic component to disrupt the biochemistry of the envelope 204 of the virus 201. The filter structure 102 uses a plurality of P&P media components to disrupt the biochemistry of the protein shell 203 of the virus 201. The filter structure 102 is arranged such that the air flow 113 flows sequentially through each of the plurality of filter beds that make up the filter structure 102.

The filter structure 102 comprises a biological filter bed 121, a metallo-organic filter bed 122, a phytochemical filter bed 123, a bitter-botanical filter bed 124, and a mechanical filter bed 125.

The biological filter bed 121 is a bed filter. The biological filter bed 121 is an end structure of the filter structure 102. The biological filter bed 121 draws air flow 113 into the filter structure 102 for processing when the blower 112 is operating in a pull mode. The biological filter bed 121 discharges the processed air flow 113 from the filter structure 102 into the atmosphere when the blower 112 is operating in a push mode. The biological filter bed 121 comprises a plurality of plants 131 and a growth media 132. Wherein the plurality of plants 131 grow in the growth media 132. The biological filter bed 121 sequesters the viruses from the incoming (for pull through mode) and the exiting (for push through mode) air flow stream.

Each of the plurality of plants 131 is a fragrant plant. Each of the plurality of plants 131 is selected to release volatile and semi-volatile essential oils used to absorb the virus 201. The plants contained in the plurality of plants 131 are selected from the group consisting of lavender (*lavandula* genus), a basil (*Ocimum basilicum*), a tea rose *begonia* (*begonia* genus), a mint (*mentha* genus), a cuban oregano (*Plectranthus amboinicus*), and a passionflower (*passiflora* genus). The lavender (*lavandula* genus) is a fragrant plant that is suitable for planting in the biological filter bed 121. The basil (*Ocimum basilicum*) is a fragrant plant that is suitable for planting in the biological filter bed 121. The tea rose *begonia* (*begonia* genus) is a fragrant plant that is suitable for planting in the biological filter bed 121. The mint (*mentha* genus) is a fragrant plant that is suitable for planting in the biological filter bed 121. The cuban oregano (*Plectranthus amboinicus*) is a fragrant plant that is suitable for planting in the biological filter bed 121. The passionflower (*passiflora* genus) is a fragrant plant that is suitable for planting in the biological filter bed 121.

The growth media 132 is an organic soil mixture that: a) supports the life cycle of the plurality of plants 131; and b) exposes the viruses 201 contained in the air flow 113 to a high pH environment as the air flow 113 flows into the filter structure 102. The growth media 132 is formed as a mixture of the topsoil 181 and the naturally occurring carbonate structure 182. The growth media 132 comprises a topsoil 181 and a naturally occurring carbonate structure 182.

The topsoil 181 and the naturally occurring carbonate structure 182 are mixed such that the topsoil 181 makes up greater than or equal to 85% (w/w) of the dry weight of the growth media 132. The topsoil 181 and the naturally occurring carbonate structure 182 are mixed such that the naturally occurring carbonate structure 182 makes up greater than or equal to 10% (w/w) of the dry weight of the growth media 132.

The topsoil 181 is defined elsewhere in this disclosure. The naturally occurring carbonate structure 182 is an inorganic chemical substance used to control the pH of the topsoil 181. The naturally occurring carbonate structure 182 is a salt of carboxylic acid. The naturally occurring carbonate structure 182 is selected from the group consisting of agricultural lime, magnesite, and dolomite.

The agricultural lime is a commercially available mixture of a plurality of carbonates. The magnesite is a crystalline carbonate formed with magnesium. The dolomite is a crystalline carbonate. The molecular structure of the dolomite comprises one magnesium atom, one calcium atom, and two molecules of carboxylic acid.

The metallo-organic filter bed 122 is a bed filter. The nano-silver embedded activated carbon 141 that forms the metallo-organic filter bed 122 has a granulated structure. The nano-silver embedded activated carbon 141 provides the initial disinfection phase of the one or more viruses 201 that pass through the invention 100. The average granule size of the nano-silver embedded activated carbon 141 that forms the metallo-organic filter bed 122 is between 20 and 30 mesh. The activated carbon structure of the metallo-organic filter bed 122 presents a surface area within the metallo-organic filter bed 122 over which the air flow 113 flows. A portion of viruses 201 contained within the air flow 113 are adsorbed onto activated carbon structure. The nano-silver particles embedded in the metallo-organic filter bed 122 are known to interact with and disrupt the bilayer lipid structure of the envelope 204 of the virus 201 such that the membrane structure of the envelope 204 breaks down allowing access to the protein shell 203 by the phytochemical filter bed 123 and the bitter-botanical filter bed 124 of the filter structure 102. The nano silver particles have intrinsic anti-viral properties that further disinfect the viruses 201 from the air flow 113.

The metallo-organic filter bed 122 further comprises a nano-silver embedded activated carbon 141. The nano-silver embedded activated carbon 141 used to form the metallo-organic filter bed 122 is a chemical structure that has been previously disclosed by the applicant in USPTO patent grants U.S. Pat. No. 9,963,367B1 and U.S. Pat. No. 10,059,605B1.

The phytochemical filter bed 123 is a finely crushed or chopped collection of plants. The phytochemical filter bed 123 exposes the air flow 113 to a plurality of P&P media. Each P&P media is selected from the group consisting of: a) the flavonoid chemical group; b) the terpenoid chemical group; c) polyphenol chemical group; d) the polyacetylene chemical group; and, e) the saponin chemical group.

The flavonoid chemical group has anti-oxidant properties known to disrupt the tertiary and quaternary protein structures in the protein shell 203. The terpenoid chemical group has cytotoxic properties known to interfere with bi-layer lipid structures commonly found in cell membranes including the envelope 204. The terpenoid chemical group has anti-oxidant properties known to disrupt the tertiary and quaternary protein structures in the protein shell 203. The polyphenol chemical group has properties known to disrupt the tertiary and quaternary protein structures in the protein shell 203. The polyphenol chemical group has properties known to interfere with bonding functions of the amine chemical groups such as those found in proteins. The polyacetylene chemical group is a lipid soluble structure with known antiviral activities. Members of the polyacetylene chemical group are therefore capable of dissolving within the envelope 204 of a virus 201 from where it can subsequently neutralize the virus 201 when presented with the opportunity. The saponin chemical group has surfactant properties known to influence solubility and to disrupt lipid based structures such as those found in the envelope 204.

The phytochemical filter bed 123 comprises a combination of one or more plants selected from the group consisting of *aglaia* (*aglaia* genus), *bupleurum* (*bupleurum* genus), triphala, thyme (*Thymus vulgaris*), clove (*Syzygium aromaticum*), and cinnamon (*cinnamomum* genus).

The *aglaia* (*aglaia* genus) is a plant that provides the phytochemical filter bed 123 with the P&P media dammarenolic acid, triterpenoid, and silvestrol benzofuran. The *aglaia* (*aglaia* genus) makes up between 27% and 33% (w/w) (inclusive) of the weight of the phytochemical filter bed 123.

The *bupleurum* (*bupleurum* genus) is a plant that provides the phytochemical filter bed 123 with phytochemical benefits from saikosaponin. The *bupleurum* (*bupleurum* genus) makes up between 27% and 33% (w/w) (inclusive) of the weight of the phytochemical filter bed 123.

The triphala is a mixture of materials derived from a plurality of pharmacologically active plants that provides the phytochemical filter bed 123 with phytochemical benefits from ascorbic acid. The triphala makes up between 5% and 15% (w/w) (inclusive) of the weight of the phytochemical filter bed 123. The triphala comprises a combination of one or more plants selected from the group consisting of a myrobalan plum (*Prunus cerasifera*), an emblic myrobalan (*Phyllanthus emblica*), a beleric myrobalan (*Terminalia bellirica*), and a black myrobalan (*Terminalia chebula*). The myrobalan plum (*Prunus cerasifera*) is a plant that is traditionally used in the formulation of triphala. The emblic myrobalan (*Phyllanthus emblica*) is a plant that is traditionally used in the formulation of triphala. The beleric myrobalan (*Terminalia bellirica*) is a plant that is traditionally used in the formulation of triphala. The black myrobalan (*Terminalia chebula*) is a plant that is traditionally used in the formulation of triphala.

The thyme (*Thymus vulgaris*) is a plant that provides the phytochemical filter bed 123 with phytochemical benefits from thymol, cavarcrol, and camphor. The thyme (*Thymus vulgaris*) makes up between 5% and 15% (w/w) (inclusive) of the weight of the phytochemical filter bed 123.

The clove (*Syzygium aromaticum*) is a plant that provides the phytochemical filter bed 123 with phytochemical benefits from eugenol. The clove (*Syzygium aromaticum*) makes up between 5% and 15% (w/w) (inclusive) of the weight of the phytochemical filter bed 123.

The cinnamon (*cinnamomum* genus) is a plant that provides the phytochemical filter bed 123 with phytochemical benefits from cinnamaldehyde and cinnamic acid. The cinnamon (*cinnamomum* genus) makes up between 5% and 15% (w/w) (inclusive) of the weight of the phytochemical filter bed 123.

The essential oils provided by the P&P media used in the invention 100, including the essential oils the thyme (*Thymus vulgaris*), the clove (*Syzygium aromaticum*), and the cinnamon (*cinnamomum* genus) form a hydrophobic liquid phase non-polar solvent that will dissolve the bi-layer lipid structure of the envelope 204 of the virus 201. By dissolving the bi-layer lipid structure of the envelope 204, the protein shell 203 becomes accessible to other P&P media structures contained within the invention 100.

The applicant has determined that the phytochemical filter bed 123 is most effective when the P&P media used to form the phytochemical filter bed 123 are dried at a temperature between 80 C and 120 C.

The bitter-botanical filter bed 124 is a bed filter. The bitter-botanical filter bed 124 is a finely crushed or chopped collection of plants. The plants and vegetation selected for the bitter-botanical filter bed 124 are known to contain some of the most bitter P&P media known to mankind. Once processed, the filter materials of the bitter-botanical filter bed 124 are dried at a temperature of between 80 C and 120 C (inclusive) before use in the bitter-botanical filter bed 124. The bitter-botanical filter bed 124 exposes the air flow 113 to one or more bitter P&P media.

Each of the bitter P&P media of the bitter-botanical filter bed 124 has an alkaloid structure. The lipid soluble nature of an alkaloid chemical allows the alkaloid chemical to dissolve into the bi-layer lipid structure of the envelope 204 of the virus 201. Once dissolved in the envelope 204, the basic nature of the alkaloid chemical interferes with the passive osmotic processes used by virus 201 to interact with its environment. The basic pH of the alkaloid chemicals in the bitter-botanical filter bed 124 further serves to disrupt the tertiary and quaternary protein structures in the protein shell 203 of the virus 201.

The bitter-botanical filter bed 124 comprises a combination of one or more compounds selected from the group consisting of hop (*Humulus lupulus*), neem (*Azadirachta indica*), bitter leaf (*Veronia amigdalina*), utazi (*grongoneml latifolium*), and bitter kola (garcina cola).

The hop (*Humulus lupulus*) is a conical plant fruit that provides a portion of the bitter P&P media contained in the bitter-botanical filter bed 124. The hop (*Humulus lupulus*) generates one or more alpha acids. The alpha acid contained in hop resins adds to the bitterness of the bitter-botanical filter bed 124 and increases the effectiveness of the bitter-botanical filter bed 124 to solubilize the lipid shell of the envelope 204 of the viruses 201. The increased solubility of the lipid shell of the envelope 204 increases the potency of other antiviral actions against viruses 201.

The hop (*Humulus lupulus*) makes up between 15% and 25% (w/w) (inclusive) of the weight of the bitter-botanical filter bed 124.

The neem (*Azadirachta indica*) is a plant that provides a portion of the bitter P&P media contained in the bitter-botanical filter bed 124. The neem (*Azadirachta indica*) makes up between 15% and 25% (w/w) (inclusive) of the weight of the bitter-botanical filter bed 124.

The bitter leaf (*Veronia amigdalina*) is a plant that provides a portion of the bitter P&P media contained in the bitter-botanical filter bed 124. The bitter leaf (*Veronia amigdalina*) makes up between 15% and 25% (w/w) (inclusive) of the weight of the bitter-botanical filter bed 124.

The utazi (*grongoneml latifolium*) is a plant that provides a portion of the bitter P&P media contained in the bitter-botanical filter bed 124. The utazi (*grongoneml latifolium*) makes up between 15% and 25% (w/w) (inclusive) of the weight of the bitter-botanical filter bed 124.

The bitter kola (garcina cola) is a plant that provides a portion of the bitter P&P media contained in the bitter-botanical filter bed 124. The bitter kola (garcina cola) makes up between 15% and 25% (w/w) (inclusive) of the weight of the bitter-botanical filter bed 124.

The combination of the phytochemical filter bed 123 and bitter-botanical filter bed 124 work in synergy to damage viruses 201 such as COVID 19 that are not sequestered within the invention 100. The damage caused by the phytochemical filter bed 123 and bitter-botanical filter bed 124 prevents and neutralizes the formation of uncontrolled quantity of cytokines created by the immune system after a virus 201 (such as COVID 19) enter the body. Generally referred as "cytokine storm", cytokines are pro inflammatory proteins that are formed when COVID 19 RNA based viruses attach to human cells and release uncontrolled burst of small proteins. Cytokines are generally attributed for damaging or limiting the oxygen intake for respiratory system and cause death. The P&P media substances in the phytochemical filter bed 123 and bitter-botanical filter bed 124 work in synergy to scavenge and neutralize the cytokines and protect the human respiratory system.

The mechanical filter bed 125 is a glass wool structure. The mechanical filter bed 125 is positioned such that the mechanical filter bed 125 filters the air flow 113 after the air flow 113 has been processed by the metallo-organic filter bed 122, the phytochemical filter bed 123, and the bitter-botanical filter bed 124. The mechanical filter bed 125 removes any particulate matter that has been dislodged by the air flow 113 from the metallo-organic filter bed 122, the phytochemical filter bed 123, and the bitter-botanical filter bed 124 before the air flow 113 is discharged from the invention 100. The glass wool forms a gas permeable structure that is sized to remove all respiratory droplets greater than 2 microns in diameter.

When the blower 112 is operating in the pull mode, the air flow 113 passes through the plurality of filter beds in the following sequence selected from the group consisting of the biological filter bed 121 (first), the metallo-organic filter bed 122, the phytochemical filter bed 123, the bitter-botanical filter bed 124, and the mechanical filter bed 125.

When the blower 112 is operating in the push mode, the air flow 113 passes through the plurality of filter beds in a sequence selected from the group consisting of: c) the mechanical filter bed 125 (first), the bitter-botanical filter bed 124, the phytochemical filter bed 123, the metallo-organic filter bed 122, and the biological filter bed 121 (last).

In the first potential embodiment of the disclosure, the metallo-organic filter bed 122, the phytochemical filter bed 123, and the bitter-botanical filter bed 124 are ground into a granular form that is contained within a pouch. By a granular form is: a) that the carbon be in a granular form; and, b) the average size of the P&P media used in the phytochemical filter bed 123 and the bitter-botanical filter bed 124 is between 20 and 50 mesh. The pouch is a non-woven fabric structure. The pouch forms a gas permeable structure that removes all respiratory droplets greater than 2 microns in diameter.

The following definitions were used in this disclosure:

Alkaloid: As used in this disclosure, an alkaloid refers to a chemical with a molecular structure that contains one or more heterocyclic rings. The alkaloid generally has a high pH (i.e. is a basic substance). An alkaloid is typically soluble in water with a low (acidic) pH and soluble in lipids with a neutral or high (basic) pH.

Amine Functional Group: As used in this disclosure, the amine functional group is a functional group with the chemical formula —NH2.

Amino Acid: As used in this disclosure, an amino acid refers to a carbon atom that has a carboxyl functional group and an amine functional group. The standard amino acids refers to the twenty to twenty two-amino acids commonly used for biological functions. The range of twenty to twenty two depends on the specific context: the first twenty amino acids refer to the amino acids that are incorporated into proteins using the normal biosynthetic process while two additional amino acids can be incorporated into proteins using alternate biological mechanisms.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Bed Filter: As used in this disclosure, a bed filter comprises a particulate material through which a fluid is passed such that particulate material captures solids contained within the fluid while allowing the fluid itself to pass through the particulate matter.

Biochemistry: As used in this disclosure, biochemistry refers to the chemical substances and the chemical processes associated with biological processes.

Bitter: As used in this disclosure, a bitter is a phytochemical that contains an alkaloid structure.

Blower: As used in this disclosure, a blower is a mechanical device with rotating blades that is used to create a flow or current of air.

Carbohydrate: As used in this disclosure, a carbohydrate refers to a polymer chain formed form sugar molecules. The chemical formula of carbohydrates takes the general form of Cx(H2O)x where x is a positive integer. Carbohydrates are often referred to as a starch.

Carbonic Acid: As used in this disclosure, carbonic acid (CAS 463-79-6) is a chemical structure with the chemical formula H2CO3 (HO—(C═O)—OH). The salt of a carbonic acid is called a carbonate.

COVID-19: As used in this disclosure, COVID-19 is a virus that is highly contagious between humans. The COVID-19 virus is also known as the severe acute respiratory syndrome coronavirus 2 (SARS-CoV-2). The COVID-19 is responsible for the COVID-19 pandemic of 2020. The COVID-19 is an evolved virus. The COVID-19 has a diameter a range of between 50 and 200 nanometers. This disclosure assumes that a representative diameter for COVID-19 is 100 nanometers. As of the writing of this definition, the environmental stability (the half-life survival time of the virus outside of the host) is between one and ten hours.

Crystal: As used in this disclosure, a crystal refers to a three-dimensional solid material whose molecules are arranged in a regular (or repeating) geometric structure. A crystal will often have a symmetric structure.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Essential Oil: As used in this disclosure, an essential oil is a lipid based solution that contains one or more volatile aroma compounds dissolved in a non-polar solvent. Examples of naturally occurring essential oils include, but are not limited to, basil oil, black pepper oil, caraway oil, *cannabis* flower oil, cedar wood oil, cinnamon oil, citronella oil, chamomile oil, clove oil, davana oil, *eucalyptus* oil, frankincense oil, horseradish oil, jasmine oil, lavender oil, lemon oil, lemongrass oil, mandarin oil, nutmeg oil, orange oil, oregano oil, peppermint oil, pine oil, sage oil, sandalwood oil, star anise oil, and thyme oil. Basil oil, cedar wood oil, citronella oil, chamomile oil, clove oil, lavender oil, lemongrass oil, and peppermint oil are traditionally considered to have insect repellent and insecticide properties.

Filter: As used in this disclosure, a filter is a mechanical device that is used to separate solids that are suspended in a liquid or a gas. A strainer is type of filter with what would be considered a coarse mesh measurement.

Flavonoid: As used in this disclosure, a flavonoid is a phytochemical. The flavonoid comprises a collection of functional groups attached to a chemical backbone selected from the group consisting of: a) the flavone (CAS 525-82-6) chemical group; b) the isoflavone chemical group (CAS 446-72-0); and, c) the neoflavonoid (CAS 51870-64-5) chemical group. Anthocyanins are a common subclass of flavonoid based on the flavone chemical group.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Functional Group: As used in this disclosure, a functional group is specific chemical structure that 1) defines the structure of a chemical family; and, 2) determines the properties of the chemical family. Common functional groups include, but are not limited to, aldehydes, alkanes, alkenes, alkynes, alcohols, amides, amines, carboxylic acids, esters, ethers, haloalkanes, haloalkenes, haloalkynes, and ketones. As a practical matter, the intention of this definition is to use the term functional group in the same manner as the term is commonly used in organic chemistry.

Gas: As used in this disclosure, a gas refers to a state (phase) of matter that is fluid and that fills the volume of the structure that contains it. Stated differently, the volume of a gas always equals the volume of its container.

Glycoside: As used in this disclosure, a glycoside is a sugar or a carbohydrate that further comprises one or more functional groups.

Heterocyclic: As used in this disclosure, heterocyclic refers to (a typically carbon based) ring shaped molecule that contains a least one nitrogen atom in the ring structure.

Inert: As used in this disclosure, inert is an adjective that is applied to an object, system, or chemical reaction. Inert means that the object, system, or chemical reaction is incapable of internal motion, internal activity or is otherwise unreactive.

Lipid: As used in this disclosure, a lipid is an organic molecule that is soluble in nonpolar solvents.

Liquid: As used in this disclosure, a liquid refers to a state (phase) of matter that is fluid and that maintains, for a given pressure, a fixed volume that is independent of the volume of the container.

Mesh: As used in this disclosure, the term mesh refers to a measure of the size of particle a screen or sieve will pass. Specifically, mesh refers to the number of holes per linear inch of the screen or sieve surface. For example, a sieve surface with ten holes per linear inch is referred to as 10 mesh. A ten mesh screen or sieve surface will have on average 100 holes per square inch. The average surface area of an individual hole in a ten mesh screen is approximately 6.5 square millimeters.

Metal: As used in this disclosure, a metal is an element that readily loses electrons or an alloy formed from a plurality of such elements. General properties of metals include, but are not limited to, the ability to conduct electricity, malleability, and the ability to be drawn into a wire. For the purposes of this disclosure, the term metal refers to elements in columns 1-12 of the periodic table and further includes aluminum, tin, and lead.

Microorganism: As used in this disclosure, a microorganism is an organism too small to be viewed by the unaided eye. Microorganisms are typically single celled organisms such as bacteria, yeast, viruses, protozoa, fungi and algae. A pathogen refers to a microorganism that has the potential to cause illness or disease.

Neutralize: As used in this disclosure, the verb to neutralize means to make something inert. In this disclosure, the term terminate is used to describe an object that has been neutralized.

Non-Polar Molecule: As used in this disclosure, a non-polar molecule refers to a molecular structure that: a) is electrically neutral; and, b) has a uniform spatial distribution of the electrons within the molecule.

Normal Temperature and Pressure: As used in this disclosure, normal temperature and pressure refers to gas storage conditions corresponding to 20 degrees C. at 100 kPa (approx. 1 atmosphere). Normal temperature and pressure is often abbreviated as NTP.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

P&P Media: As used in this disclosure, the term P&P media is an abbreviation for phytochemically and pharmacologically active media.

Particle: As used in this disclosure, a particle is a discrete object of a small size relative to the context of discussion. The term particle is used when: a) the volume of the particle; b) the structure of the particle; and, c) the motion of elements within the particle are not relevant to the context of the discussion. The adjective form of particle is particulate. A weight of particles will often form a bulk solid.

Peptide: As used in this disclosure, a peptide is refers to a molecular sequence formed with one or more bonds between two or more amino acids. Unless otherwise stated in this disclosure, the amino acids are not limited to the standard amino acids.

Pharmacologically Active Media: As used in this disclosure, a pharmacologically active media refers to a chemical substance that has a biochemical or physiological effect on a biological organism.

Phase: As used in this disclosure, phase refers to the state of the form of matter. The common states of matter are solid, liquid, gas, and plasma.

Phytochemical: As used in this disclosure, a phytochemical is a pharmacologically active media that is produced in and harvested from a plant. A phytochemical comprises a pharmacologically active media selected from the group from: a) the flavonoid chemical group; b) the terpenoid chemical group (including the carotenoid chemical subgroup of the terpenoid chemical group); c) polyphenol chemical group; and, d) the polyacetylene chemical group.

Plant: As used in this disclosure, a plant is a biological organism: 1) that is not capable of movement over significant distances; and 2) that uses photosynthesis to create nutrients. The structure of the plant where photosynthesis occurs is called the leaf. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant.

Poison: As used in this disclosure, a poison is a chemical substance that interferes with the normal biological processes of a biological organism. The term poison often implies the injury to or death of the biological organism. A toxin is a poison that generates an immune system response.

Polar Molecule: As used in this disclosure, a polar molecule refers to a molecular structure that: a) is electrically neutral; but, b) does not have a uniform spatial distribution of the electrons within the molecule. A polar molecule will present one or more electrically positive poles and the same number of electrically negative poles within the molecular structure.

Polarity: As used in this disclosure, the term polarity is used to describe a physical property or physical characteristic wherein: 1) the physical property or physical characteristic manifests two opposing attributes, tendencies, characteristics, or principals; and, 2) the two opposing attributes, tendencies, characteristics, or principals have an intrinsic separation, alignment, or orientation.

Polyacetylene: As used in this disclosure, a polyacetylene is a phytochemical. The polyacetylene comprises a collection of functional groups attached to a chemical backbone that is formed from, or contains, one or more chains built from the (C2H2)n polymer where n>=2.

Polyphenol: As used in this disclosure, a polyphenol is a phytochemical. The polyphenol comprises a collection of functional groups attached to a chemical backbone formed from two or more phenol (CAS 108-95-2) molecules. A lignan refers to a dimer containing two or more identical molecules that contain a phenol.

Pouch: As used in this disclosure, a pouch is a containment space that encloses a structure with a flexible material.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protection Space: As used in this disclosure, a protection space is a space formed by a boundary structure. The boundary structure forms a protective barrier that protects objects outside the protection space from potential dangers from the operation of a process contained within the protection space.

Protein: As used in this disclosure, a protein refers to a molecular sequence of amino acids. Unless otherwise stated in this disclosure, a protein is exclusively formed from the standard amino acids. The order of the standard amino acids within the protein is said to be the primary structure of the protein. A protein that is formed from biological mechanisms is formed with a series of secondary, tertiary, and quaternary bonds that form the secondary, tertiary, and quaternary structure that form the characteristic shape of the specific protein. A protein that has had one or more of the secondary, tertiary, and quaternary bonds broken is said to be denatured.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Radial: As used in this disclosure, the term radial refers to a direction that: 1) is perpendicular to an identified central axis; or, 2) projects away from a center point.

Roughly: As used in this disclosure, roughly refers to a comparison between two objects. Roughly means that the difference between one or more parameters of the two compared objects are not significantly different.

Salt: As used in this disclosure, a salt means an ionic compound that further comprises at least one atom of a metallic element or compound and one atom of a non-metallic element or compound. When dissolved in water, the ionic compound releases the metallic element and the non-metallic element into the water as ions. In this disclosure, a metallic element is assumed to include the alkali metals and the alkali earth metals.

Alternatively, and equivalently, a metallic element may be assumed to be any element on the periodic table that is to the left of the metalloids.

Saponin: As used in this disclosure, a saponin is a glycoside that has a steroid (or similarly cyclic) molecule as its functional group.

Sequester: As used in this disclosure, to sequester means to store an object in a protection space such that the sequestered object will not interact with the environment outside of the protection space.

Silver: As used in this disclosure, silver (CAS 7440-22-4) refers to the element with atomic number 47 in the periodic table. The standard abbreviation for chlorine is Ag. As used in this disclosure, the term nanosilver refers to silver in a particulate form wherein each particle of silver has a diameter on the order of 10E-9 meters.

Soil: As used in this disclosure, soil refers to the structure of the ground that forms the earth. The soil is organized into horizontal levels known as the top soil, subsoil, and bed rock. The top soil is the soil level with the highest elevation. The top soil is has a bulk solid structure that further contains a relatively high proportion of biologically generated material. The bedrock is the soil level with the lowest elevation. The bedrock is formed with a primarily rock structure. The bedrock forms a solid foundation which can reliably support structures. The subsoil is a layer of soil between the top soil and the bedrock. The subsoil has a bulk solid structure that further: a) has a lower proportion of biological material; and, b) has a higher density, or stated differently is more compressed than, the top soil.

Steroid: As used in this disclosure, a steroid is an organic molecule formed from a base structure four ring-shaped structures. A steroid is classified as a lipid. A steroid is a pharmacologically active media that mediates fluid viscosity within a cell membrane and performs chemical signaling functions within a biological organism.

Sugar: As used in this disclosure, a sugar refers to a carbohydrate that readily dissolves in water. This disclosure assumes that the carbohydrate that forms the sugar contains 12 or fewer carbon atoms.

Terpenoid: As used in this disclosure, a terpenoid is a phytochemical. The terpenoid comprises a collection of functional groups attached to a chemical backbone of a terpene. The terpene is a chemical structure formed from an integer number of isoprene (CAS 78-79-5) molecules. The functional groups attached to the terpenoid will always include at least one hydroxyl (alcohol) group.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Virus: As used in this disclosure, a virus is a biological entity that is capable of reproduction but does not have the biological mechanisms to generate the energy for replication. A virus "infects" a host cell and uses the biochemical biological processes of the host cell as the energy source that allows the virus to replicate. Because the virus is incapable of independently generating the biochemical energy necessary for reproduction, the traditional view is that viruses are not a form of life. All viruses comprises a nucleic acid structure and a protein shell. The nucleic acid structure is a genetic material is selected from the group consisting of RNA and DNA. The nucleic acid structure is enclosed within the protein shell. The protein shell is known as the capsid. The proteins of the capsid are encoded by the nucleic acid structure. The capsid: a) protects the nucleic acid structure when the virus is dormant; and, b) attaches the virus to a biological structure of a host cell that is suitable to support the replication of the virus. More evolved viruses further comprise an envelope. The envelope is a lipid based structure that is similar to a cell membrane. By similar to the cell membrane is meant that: a) the envelope is formed with a bilayer lipid structure similar to a cell membrane; and, b) the envelope will display membrane protein structures to its environment in a similar to a cell membrane. The envelope encloses the capsid and the nucleic acid structure. In this disclosure, a virus formed with an envelope is referred to as an evolved virus.

Volatile: As used in this disclosure, volatile refers to a substance that will evaporate or sublimate into a gas state at normal temperature and pressure.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. An indoor air filter comprising
a flow chamber and a filter structure;
wherein the flow chamber contains the filter structure;
wherein the indoor air filter is configured for use in an indoor atmosphere that contains one or more viruses;
wherein the indoor air filter is a phytochemically and pharmacologically active media structure (P&P media);
wherein the filter structure is configured to sequester the one or more viruses;

wherein the filter structure is configured to terminate the biological processes of the one or more viruses by exposing the one or more viruses to biochemical structures formed from the P&P media;

wherein the flow chamber forces unprocessed air through the filter structure such that the filter structure removes the one or more viruses from the air flow;

wherein the filter structure comprises a metallo-organic component and a plurality of P&P media components;

wherein the metallo-organic component disrupts the biochemistry of the virus;

wherein the plurality of P&P media components disrupt the biochemistry of the virus;

wherein the filter structure is arranged such that the air flow flows sequentially through the metallo-organic component and each of the plurality of P&P media that make up the filter structure.

2. The indoor air filter according to claim 1
wherein the filter structure is a mechanical structure;
wherein the filter structure comprises a plurality of bed filters;
wherein each of the plurality of bed filters comprises a structure selected from the group consisting of: a) the metallo-organic component; and, b) one or more P&P media components selected from the plurality of P&P media components;
wherein the filter structure captures and sequesters viruses found in the air flow;
wherein the filter structure disrupts the biochemistry of the envelope of the virus;
wherein the filter structure further disrupts the biochemistry of the protein shell of the virus.

3. The indoor air filter according to claim 2
wherein the flow chamber is a mechanical structure;
wherein the flow chamber generates an air flow through the filter structure;
wherein the flow chamber comprises a containment structure and a blower;
wherein the blower generates the air flow through the containment structure;
wherein the blower forces the air flow through the filter structure.

4. The indoor air filter according to claim 3
wherein the filter structure comprises a biological filter bed, a metallo-organic filter bed, a phytochemical filter bed, a bitter-botanical filter bed, and a mechanical filter bed;
wherein the airflow is forced through the biological filter bed, the metallo-organic filter bed, the phytochemical filter bed, the bitter-botanical filter bed, and the mechanical filter bed.

5. The indoor air filter according to claim 4
wherein the metallo-organic filter bed is a bed filter;
wherein the metallo-organic filter bed further comprises a nano-silver embedded activated carbon;
wherein the nano-silver embedded activated carbon that forms the metallo-organic filter bed has a granulated structure;
wherein the nano-silver embedded activated carbon provides the initial disinfection phase of the one or more viruses that pass through the indoor air filter;
wherein the average granule size of the nano-silver embedded activated carbon that forms the metallo-organic filter bed is between 20 and 50 mesh;
wherein the activated carbon structure of the metallo-organic filter bed presents a surface area within the metallo-organic filter bed over which the air flow passes;
wherein a portion of the viruses contained within the air flow are adsorbed onto activated carbon structure;
wherein the nano-silver particles embedded in the metallo-organic filter bed interact with and disrupt a bilayer lipid structure of the envelope of the virus such that the membrane structure of the envelope breaks down allowing access to the protein shell for the phytochemical filter bed and the bitter-botanical filter bed of the filter structure;
wherein the nano silver particles have anti-viral properties that further disinfect the viruses from the air flow.

6. The indoor air filter according to claim 5
wherein the phytochemical filter bed is a collection of plants that have been processed using a process selected from the group consisting of crushed size reduction operations and chopped size reduction operations;
wherein the phytochemical filter bed exposes the air flow to a plurality of P&P media;
wherein each P&P media is selected from the group consisting of: a) the flavonoid chemical group; b) the terpenoid chemical group; c) polyphenol chemical group; d) the polyacetylene chemical group; and, e) the saponin chemical group;
wherein the flavonoid chemical group has anti-oxidant properties known to disrupt the tertiary and quaternary protein structures in the protein shell;
wherein the terpenoid chemical group has cytotoxic properties known to interfere with the bilayer lipid structure of the envelope of the virus;
wherein the terpenoid chemical group has anti-oxidant properties known to disrupt the tertiary and quaternary protein structures in the protein shell;
wherein the polyphenol chemical group has properties known to disrupt the tertiary and quaternary protein structures in the protein shell;
wherein the polyphenol chemical group has properties known to interfere with bonding functions of the amine chemical;
wherein the polyacetylene chemical group is a lipid soluble structure with known antiviral activities;
wherein members of the polyacetylene chemical group dissolve within the envelope of a virus and neutralizes the virus;
wherein the saponin chemical group has surfactant properties that influence solubility and to disrupt the bilayer lipid structure of the envelope of the virus.

7. The indoor air filter according to claim 6
wherein the bitter-botanical filter bed is a bed filter;
wherein the bitter-botanical filter bed is a collection of plants that have been processed using a process selected from the group consisting of crushed size reduction operations and chopped size reduction operations;
wherein the bitter-botanical filter bed exposes the air flow to one or more bitter P&P media;
wherein each of the bitter P&P media of the bitter-botanical filter bed has an alkaloid structure;
wherein the lipid soluble nature of an alkaloid chemical allows the alkaloid chemical to dissolve into the bilayer lipid structure of the envelope of the virus;

wherein once dissolved in the envelope, the basic nature of the alkaloid chemical interferes with the passive osmotic processes used by the virus to interact with its environment;

wherein the basic pH of the alkaloid chemicals in the bitter-botanical filter bed further disrupts the tertiary and quaternary protein structures in the protein shell of the virus.

8. The indoor air filter according to claim 7 wherein the phytochemical filter bed comprises a combination of one or more plants selected from the group consisting of *aglaia* (*aglaia* genus), *bupleurum* (*bupleurum* genus), triphala, thyme (*Thymus vulgaris*), clove (*Syzygium aromaticum*), and cinnamon (*cinnamomum* genus);

wherein the *aglaia* (*aglaia* genus) is a plant that provides the phytochemical filter bed with the phytochemical benefits from dammarenolic acid, triterpenoid, and silvestrol benzofuran;

wherein the *aglaia* (*aglaia* genus) makes up between 27% and 33% (w/w: all inclusive) of the weight of the phytochemical filter bed;

wherein the *bupleurum* (*bupleurum* genus) is a plant that provides the phytochemical filter bed with phytochemical benefits from saikosaponin;

wherein the *bupleurum* (*bupleurum* genus) makes up between 27% and 33% (w/w: all inclusive) of the weight of the phytochemical filter bed;

wherein the triphala is a mixture of materials derived from a plurality of pharmacologically active plants that provides the phytochemical filter bed with phytochemical benefits from ascorbic acid;

wherein the triphala makes up between 5% and 15% (w/w: all inclusive) of the weight of the phytochemical filter bed;

wherein the thyme (*Thymus vulgaris*) is a plant that provides the phytochemical filter bed with phytochemical benefits from thymol, cavarcrol, and camphor;

wherein the thyme (*Thymus vulgaris*) makes up between 5% and 15% (w/w: all inclusive) of the weight of the phytochemical filter bed;

wherein the clove (*Syzygium aromaticum*) is a plant that provides the phytochemical filter bed with phytochemical benefits from eugenol;

wherein the clove (*Syzygium aromaticum*) makes up between 5% and 15% (w/w: all inclusive) of the weight of the phytochemical filter bed;

wherein the cinnamon (*cinnamomum* genus) is a plant that provides the phytochemical filter bed with phytochemical benefits from cinnamaldehyde and cinnamic acid;

wherein the cinnamon (*cinnamomum* genus) makes up between 5% and 15% (w/w: all inclusive) of the weight of the phytochemical filter bed.

9. The indoor air filter according to claim 8 wherein the bitter-botanical filter bed comprises a combination of two or more compounds selected from the group consisting of hop (*Humulus lupulus*), neem (*Azadirachta indica*), bitter leaf (*veronia amigdalina*), utazi (*grongoneml latifolium*), and bitter kola (garcina cola);

wherein the hop (*Humulus lupulus*) is a conical plant fruit that provides a portion of the bitter P&P media contained in the bitter-botanical filter bed;

wherein the hop (*Humulus lupulus*) generates one or more alpha acids;

wherein the alpha acid contained in hop resins adds to the bitterness of the bitter-botanical filter bed and increases the effectiveness of the bitter-botanical filter bed to solubilize bilayer lipid structure of the envelope of the virus;

wherein the increased solubility of the bilayer lipid structure of the envelope of the virus increases the potency of other antiviral actions against viruses;

wherein the hop (*Humulus lupulus*) makes up between 0% to 25% (w/w: all inclusive) of the weight of the bitter-botanical filter bed;

wherein the neem (*Azadirachta indica*) is a plant that provides a portion of the bitter P&P media contained in the bitter-botanical filter bed;

wherein the neem (*Azadirachta indica*) makes up between 0% to 25% (w/w: all inclusive) of the weight of the bitter-botanical filter bed;

wherein the bitter leaf (*Veronia amigdalina*) is a plant that provides a portion of the bitter P&P media contained in the bitter-botanical filter bed;

wherein the bitter leaf (*Veronia amigdalina*) makes up between 0% to 25% (w/w: all inclusive) of the weight of the bitter-botanical filter bed;

wherein the utazi (*grongoneml latifolium*) is a plant that provides a portion of the bitter P&P media contained in the bitter-botanical filter bed;

wherein the utazi (*grongoneml latifolium*) makes up between 0% to 25% (w/w: all inclusive) of the weight of the bitter-botanical filter bed;

wherein the bitter kola (garcina cola) is a plant that provides a portion of the bitter P&P media contained in the bitter-botanical filter bed;

wherein the bitter kola (garcina cola) makes up between 0% to 25% (w/w: all inclusive) of the weight of the bitter-botanical filter bed.

10. The indoor air filter according to claim 9 wherein the phytochemical filter bed and bitter-botanical filter bed prevents and neutralizes the formation of uncontrolled quantity of cytokines small proteins created by the immune system;

wherein the P&P media substances in the phytochemical filter bed and bitter-botanical filter bed work in synergy to scavenge and neutralize the cytokines and protect the human respiratory system.

11. The indoor air filter according to claim 10 wherein the triphala comprises a combination of two or more plants selected from the group consisting of a myrobalan plum (*Prunus cerasifera*), an emblic myrobalan (*Phyllanthus emblica*), a beleric myrobalan (*Terminalia bellirica*), and a black myrobalan (*Terminalia chebula*);

wherein the myrobalan plum (*Prunus cerasifera*) is a plant that is traditionally used in the formulation of triphala;

wherein the emblic myrobalan (*Phyllanthus emblica*) is a plant that is traditionally used in the formulation of triphala;

wherein the beleric myrobalan (*Terminalia bellirica*) is a plant that is traditionally used in the formulation of triphala;

wherein the black myrobalan (*Terminalia chebula*) is a plant that is traditionally used in the formulation of triphala.

12. The indoor air filter according to claim 11 wherein the mechanical filter bed is a glass wool structure;

wherein the mechanical filter bed is positioned such that the mechanical filter bed filters the air flow after the air flow has been processed by the metallo-organic filter bed, the phytochemical filter bed, and the bitter-botanical filter bed;

wherein the mechanical filter bed removes any particulate matter that has been dislodged by the air flow from the metallo-organic filter bed, the phytochemical filter bed, and the bitter-botanical filter bed before the air flow is discharged from the indoor air filter;

wherein the glass wool forms a gas permeable structure that is sized to remove all respiratory droplets greater than 2 microns in diameter.

13. The indoor air filter according to claim 12
wherein the biological filter bed is a bed filter;
wherein the biological filter bed is an end structure of the filter structure;
wherein the biological filter bed draws air flow into the filter structure for processing when the blower is operating in a pull mode;
wherein the biological filter bed discharges the processed air flow from the filter structure into the atmosphere when the blower is operating in a push mode.

14. The indoor air filter according to claim 13
wherein when the blower is operating in the pull mode, the air flow passes through the plurality of filter beds in the sequence: the biological filter bed (first), the metallo-organic filter bed, the phytochemical filter bed, the bitter-botanical filter bed, and the mechanical filter bed;
wherein when the blower is operating in the push mode, the air flow passes through the plurality of filter beds in the sequence: the mechanical filter bed (first), the bitter-botanical filter bed, the phytochemical filter bed, the metallo-organic filter bed, and the biological filter bed (last).

15. The indoor air filter according to claim 14
wherein the metallo-organic filter bed, the phytochemical filter bed, and the bitter-botanical filter bed are in a granular form that is contained within a pouch;
wherein by a granular form is meant: a) that the carbon is in a granular form; b) the average size of the P&P media used in the phytochemical filter bed; and, c) the average size of the P&P media used in the bitter-botanical filter bed is between 20 and 50 mesh;
wherein the pouch is a non-woven fabric structure;
wherein the pouch forms a gas permeable structure that removes respiratory droplets greater than 2 microns in diameter.

16. The indoor air filter according to claim 15
wherein the filter materials of the bitter-botanical filter bed are dried at a temperature of between 80 C and 120 C (inclusive) before use in the bitter-botanical filter bed;
wherein the filter materials of the phytochemical filter bed are dried at a temperature of between 80 C and 120 C (inclusive) before use in the phytochemical filter bed.

17. The indoor air filter according to claim 16
wherein the containment structure is a hollow structure;
wherein the containment structure has a tubular shape with a vertical orientation;
wherein the filter structure inserts into the hollow interior of the containment structure;
wherein the containment structure transports the air flow through the flow chamber;
wherein the blower is a mechanical device;
wherein the blower generates the air flow through the containment structure and the filter structure;
wherein the blower generates an atmospheric pressure differential along the center axis of the containment structure.

18. The indoor air filter according to claim 17
wherein the biological filter bed comprises a plurality of plants and a growth media;
wherein the biological filter bed sequesters the viruses from the incoming (for pull through mode) and the exiting (for push through mode) air flow stream;
wherein the plurality of plants grow in the growth media;
wherein each of the plurality of plants is a fragrant plant;
wherein each of the plurality of plants is selected to release volatile and semi-volatile essential oils used to absorb the bilayer lipid structure of the envelope of the virus;
wherein the biological bed can capture the entrained particles generated from the metallo-organic, phytochemical and bitter-botanical beds, for the push flow mode of operation;
wherein the plants contained in the plurality of plants are selected from the group consisting of lavender (*lavandula* genus), a basil (*Ocimum basilicum*), a tea rose begonia (*begonia* genus), a mint (*mentha* genus), a cuban oregano (*Plectranthus amboinicus*), and a passionflower (*passiflora* genus);
wherein the lavender (*lavandula* genus) is a fragrant plant that is suitable for planting in the biological filter bed;
wherein the basil (*Ocimum basilicum*) is a fragrant plant that is suitable for planting in the biological filter bed;
wherein the tea rose begonia (*begonia* genus) is a fragrant plant that is suitable for planting in the biological filter bed;
wherein the mint (*mentha* genus) is a fragrant plant that is suitable for planting in the biological filter bed;
wherein the cuban oregano (*Plectranthus amboinicus*) is a fragrant plant that is suitable for planting in the biological filter bed;
wherein the passionflower (*passiflora* genus) is a fragrant plant that is suitable for planting in the biological filter bed;
wherein the growth media is an organic soil mixture that: a) supports the life cycle of the plurality of plants; and b) exposes the viruses contained in the air flow to a high pH environment as the air flow flows into the filter structure;
wherein the growth media is formed as a mixture of the topsoil and the naturally occurring carbonate structure;
wherein the growth media comprises a topsoil and a naturally occurring carbonate structure;
wherein the topsoil and the naturally occurring carbonate structure are mixed such that the topsoil makes up greater than or equal to 85% (w/w) of the dry weight of the growth media;
wherein the topsoil and the naturally occurring carbonate structure are mixed such that the naturally occurring carbonate structure makes up greater than or equal to 10% (w/w) of the dry weight of the growth media;
wherein the naturally occurring carbonate structure is an inorganic chemical substance used to control the pH of the topsoil;
wherein the naturally occurring carbonate structure is a salt of carboxylic acid;
wherein the naturally occurring carbonate structure is selected from the group consisting of agricultural lime, magnesite, and dolomite;
wherein the agricultural lime is a commercially available mixture of a plurality of carbonates;

wherein the magnesite is a crystalline carbonate formed with magnesium;
wherein the dolomite is a crystalline carbonate;
wherein the molecular structure of the dolomite comprises one magnesium atom, one calcium atom, and two molecules of carboxylic acid.

* * * * *